US008306654B2

(12) United States Patent
Marcinik et al.

(10) Patent No.: US 8,306,654 B2
(45) Date of Patent: Nov. 6, 2012

(54) TRANSPORT AND ALIGNMENT SYSTEM FOR PRODUCING VARIABLE THICKNESS COLLATIONS

(75) Inventors: Robert F. Marcinik, Wallkill, NY (US); Russell W. Holbrook, Southbury, CT (US); Daniel J. Williams, Woodbury, CT (US); Edward M. Ifkovits, New Fairfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 490 days.

(21) Appl. No.: 12/604,755

(22) Filed: Oct. 23, 2009

(65) Prior Publication Data

US 2011/0098848 A1 Apr. 28, 2011

(51) Int. Cl.

*G05B 19/18* (2006.01)
*G06F 19/00* (2011.01)
*B65H 33/04* (2006.01)
*B65H 39/00* (2006.01)

(52) U.S. Cl. .............. 700/230; 700/57; 700/58; 700/60; 700/124; 270/58.08; 270/58.01; 270/58.29; 270/58.27

(58) Field of Classification Search ........................ None
See application file for complete search history.

(56) References Cited

U.S. PATENT DOCUMENTS

2008/0265483 A1* 10/2008 Herrmann .................. 270/58.08

* cited by examiner

*Primary Examiner* — Gene Crawford
*Assistant Examiner* — Yolanda Jones
(74) *Attorney, Agent, or Firm* — Brian A. Collins; Charles R. Malandra, Jr.; Steven J. Shapiro

(57) ABSTRACT

A system is provided for aligning multi-sheet collations including a conveyance system having a transport deck for supporting and conveying the multi-sheet collation along a feed path. The system includes a first pair of registration members disposed orthogonal to the feed path and defining a processing station along the feed path. The registration members further define registration surfaces which are repositionable from an active position above the transport deck to an idle position below the transport deck. A first displacement mechanism raises and lowers the registration members into and out of the active and idle positions, and oscillates at least one of the registration surfaces forward and aft in a direction parallel to the feed path when the registration member is in its active position. A processor controls the motion of the conveyance system relative to the registration members of the alignment station, and controls the first displacement mechanism to: (i) raise the registration surfaces into the active position, (ii) oscillate the registration surfaces to align the opposing edges of the multi-sheet collation, and (iii) lower the registration surfaces into the idle position to facilitate conveyance of the aligned multi-sheet collation along the feed path.

17 Claims, 13 Drawing Sheets

TRANSPORT AND ALIGNMENT SYSTEM FOR PRODUCING VARIABLE THICKNESS COLLATIONS

RELATED INVENTIONS

This patent application relates to commonly-owned, co-pending application Ser. No. 12/604,721 entitled "STITCHER/STAPLER FOR BINDING MULTI-SHEET COLLATIONS AND METHOD OF OPERATING THE SAME" and commonly-owned, co-pending application Ser. No. 12/604,797 entitled "RECONFIGURABLE STITCHER FOR BINDING CONSECUTIVE VARIABLE THICKNESS COLLATIONS".

FIELD OF THE INVENTION

The present invention relates to apparatus for conveying stacked sheets of material, and more particularly, to a system for aligning the peripheral edges of a stacked collation while being conveyed by a transport mechanism such as those employed in high volume mail piece inserter systems.

BACKGROUND OF THE INVENTION

Various apparatus are employed for arranging sheet material in a package suitable for use or sale in commerce. One such apparatus, useful for describing the teachings of the present invention, is a mail piece inserter system employed in the fabrication of high volume mail communications, e.g., mass mailings. Such mailpiece inserter systems are typically used by organizations such as banks, insurance companies and utility companies for producing a large volume of specific mail communications where the contents of each mailpiece are directed to a particular addressee. Also, other organizations, such as direct mailers, use mailpiece inserters for producing mass mailings where the contents of each mail piece are substantially identical with respect to each addressee. Examples of inserter systems are the 8 series, 9 series, and APS™ inserter systems available from Pitney Bowes Inc. located in Stamford, Conn., USA.

In many respects, a typical inserter system resembles a manufacturing assembly line. Sheets and other raw materials (i.e., a web of paper stock, enclosures, and envelopes) enter the mailpiece inserter as inputs. Various modules or workstations in the mailpiece inserter work cooperatively to process the sheets until a finished mail piece is produced. The precise configuration of each inserter system depends upon the needs of each customer or installation.

Typically, mailpiece inserters prepare mail pieces by arranging preprinted sheets of material into a collation, i.e., the content material of the mail piece, on a transport deck. The collation of preprinted sheets may continue to a chassis module where additional sheets or inserts may be added to a targeted audience of mail piece recipients. From the chassis module the fully developed collation may continue to a stitcher module where the sheet material may be stitched, stapled or otherwise bound. Subsequently, the bound collation is placed into a mailpiece envelope and conveyed to yet other stations for further processing. That is, the envelopes may be closed, sealed, weighed, sorted and stacked. Additionally, the inserter may include a postage meter for applying postage indicia based upon the weight and/or size of the mail piece.

FIGS. 1*a*-1*c* show the relevant components of a prior art chassis module/station 200 of an inserter system. The figures show the chassis module 200 conveying a sheet material 212 along a transport deck 214 (omitted from FIG. 1*a* to reveal underlying components). The transport deck 214 includes a drive mechanism 216 for displacing the sheet material 212 as it slides over the transport deck 214. In FIG. 1*c*, the transport deck 214 includes a low friction surface 214S having a pair of parallel grooves or slots 214G formed therein. Riding in the grooves or through the slots 214G are fingers 216F which extend orthogonally from the surface 214S of the deck 214.

Referring to FIGS. 1*a*-1*c*, the fingers 216F are driven by a belt or chain $\mathbf{218}_{C1}$ which, in turn, wraps around a drive sprocket or gear 218G. Furthermore, the fingers $\mathbf{216}F_1$ are spaced in equal length increments while the fingers $\mathbf{216}F_2$, of adjacent chains $\mathbf{218}_{C1}$, $\mathbf{218}_{C2}$ are substantially aligned, i.e., laterally across the transport deck 214. As such, a substantially rectangular region or pocket is established between the fingers $\mathbf{216}F_1$, $\mathbf{216}F_2$.

Above the transport deck 214 are one or more feeder mechanisms 220A, 220B (two are shown for illustration purposes) which are capable of feeding inserts 222, i.e., sheet material, to the transport deck 214. The inserts 222 may be laid to build a collation 212 or may be added to the sheet material 212 (i.e., a partial collation) initiated upstream of the transport deck 214. A controller (not shown) issues command signals to the feeder mechanisms 220A. 220B to appropriately time the feed sequence such that the inserts 222 are laid in the rectangular region 224 between the fingers $\mathbf{216}F_1$, $\mathbf{216}F_2$. More specifically, as each pair of lateral fingers $\mathbf{216}F_1$, $\mathbf{216}F_2$ is driven within the grooves or slots 214G, one edge of the sheet material 212 is engaged to slide the collation 212 along the transport deck 214. As the sheet material 212 passes below the feeding mechanisms 220A, 220B, other sheets or inserts 222 are added. At the end of the transport deck 214, the fingers $\mathbf{216}F_1$, $\mathbf{216}F_2$ drop beneath the transport deck 214 such that the collation (i.e., the combination of the sheet material and inserts 222) may proceed to subsequent processing stations.

While the drive mechanism 216 of the prior art provides rapid transport of collated sheet material 212, 222, the stacked sheets/inserts 222 fed by the feeding mechanisms 220A, 220B can become misaligned in the rectangular space or pocket 124 provided between the fingers $\mathbf{216}F_1$, $\mathbf{216}F_2$. That is, inasmuch as the pocket 224 is oversized to accept the sheets or inserts 222, the inserts 222 can become misaligned due to a lack of positive registration surfaces on all sides of the collation 212, 222.

Various mechanisms are employed to vary the pocket size, i.e., sometimes referred to as the "pitch", between the chassis fingers. The ability to change pitch not only enables greater efficiency, i.e., a greater number of pockets for inserts, but also minimizes the misalignment of inserts being laid on a collation. Notwithstanding the ability to minimize pocket size, it will be appreciated that without positive restraint on all free edges of the collation, individual sheets or inserts will be misaligned. Consequently, prior art inserters commonly employ complex registration mechanisms or jogging devices to align the free edges of a collation. For example, inserters may employ a series of swing arms which pivot onto the transport deck, i.e., into the conveyance path of the collation. The swing arms engage and align the leading edge of a collation, i.e., the edge opposite the fingers. While the swing arms effectively maintain alignment of the collation, the mechanical complexity associated with the pivoting mechanism is a regular source of maintenance, jamming and/or failure.

In the absence of such swing arms, an inserter may employ other jogging mechanisms to align the edges of the collation. Such jogging mechanisms often employ a complex arrangement of rotating cams/discs which tap or "jog" each edge by a predetermined displacement. While such rotating cam mechanisms are useful for aligning relatively thin collations, e.g., less than fifty (50) sheets of material, thick collations can be more difficult to align due to the weight of the stacked sheets. That is, inasmuch as the weight increases the frictional forces developed between individual sheets of material, i.e., especially the lowermost sheets of the collation, it is more difficult to effect the requisite movement between sheets to align the edges of the collation. As a consequence, the edges of misaligned sheets can be damaged or torn by the motion/action of such prior art jogging mechanisms.

Additionally, many mailpiece inserters employ mechanisms, e.g., a stitcher or a stapler, to bind the collations as they travel along the transport and alignment system. These binding mechanisms must be manually adjusted depending upon the anticipated thickness of a collation within a particular mail run. That is, the size of the stitch or staple must be anticipated to penetrate and bind the collation. This operation requires significant operator intervention and does not accommodate consecutive collations which vary in thickness. With respect to the latter, stitchers/staplers of the prior art cannot bind collations which vary in thickness from one collation having a thickness of, for example, one-half inch (½"), to a subsequent or consecutive collation having a thickness of, for example, three-quarter inches within the same mail run. This is due to the fixed or constant thickness staples used in, or stitches produced by, the stitcher/stapler. While some small variation may be accommodated by the same size stitch or staple, stitcher/staplers of the prior art are generally limited to binding constant thickness collations.

In view of the foregoing it will be appreciated that transport and alignment systems, especially those which employ binding mechanisms along the feed path, are limited in terms of their throughput or processing speed. That is, in view of the time required to jog, align, bind and transport collations along the feed path, these systems can only process a fixed number of collations per unit time.

A need, therefore, exists for a system for transporting, aligning and binding consecutive variable thickness collations which improves reliability, increases throughput, and minimizes mechanical complexity.

SUMMARY OF THE INVENTION

A system is provided for aligning multi-sheet collations including a conveyance system having a transport deck for supporting and conveying the multi-sheet collation along a feed path. The system includes a first pair of registration members disposed orthogonal to the feed path and defining a processing station along the feed path. The registration members further define registration surfaces which are repositionable from an active position above the transport deck to an idle position below the transport deck. A first displacement mechanism raises and lowers the registration members into and out of the active and idle positions, and oscillates at least one of the registration surfaces forward and aft in a direction parallel to the feed path when the registration member is in its active position. A processor controls the motion of the conveyance system relative to the registration members of the alignment station, and controls the first displacement mechanism to: (i) raise the registration surfaces into the active position, (ii) oscillate the registration surfaces to align the opposing edges of the multi-sheet collation, and (iii) lower the registration surfaces into the idle position to facilitate conveyance of the aligned multi-sheet collation along the feed path.

BRIEF DESCRIPTION OF THE DRAWINGS

Further details of the present invention are provided in the accompanying drawings, detailed description, and claims.

DETAILED DESCRIPTION

The following detailed description discusses three related, yet patentably distinct inventions related to processing sheet material collations. A first relates to a stitcher/stapler for binding multi-sheet collations and method for controlling the same. A second relates to a transport and alignment system for producing variable thickness collations and a third relates to an adjustable stitcher for binding consecutive variable thickness collations. While each will be discussed under a separate heading, the description relates and defines elements common to all of the inventions.

Further, the inventions will be described in the context of a stitcher/stapler for use in a mailpiece inserter. In the broadest sense, however, the stitcher/stapler, transport/alignment system, and adjustable stitcher of the present invention may be integrated with, and/or receive input from, any sheet handling apparatus adapted to produce/process multi-sheet collations. While the inventions may be particularly useful for processing/producing mail communications, it should be appreciated that the inventions are broadly applicable to any apparatus/system which requires binding, transport and alignment of stacked sheets of material, i.e., a multi-sheet collation. As used herein, the term "collation" is any multi-sheet stack of material, i.e., having at least two (2) sheets, such as that required for fabricating, books, pamphlets, mailpiece content material etc.

Stitcher/Stapler for Binding Multi-Sheet Collation and Method of Operation

Figure 1A:
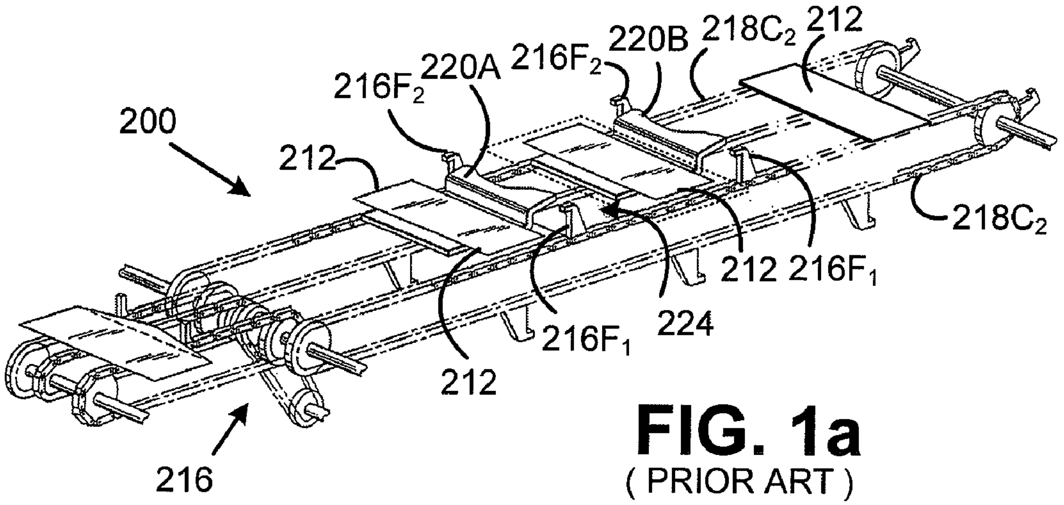
FIG. 1a ( PRIOR ART )
FIG. 1*a* is a perspective view of a prior art chassis drive mechanism employed in a mail piece inserter system.
Figure 1B:
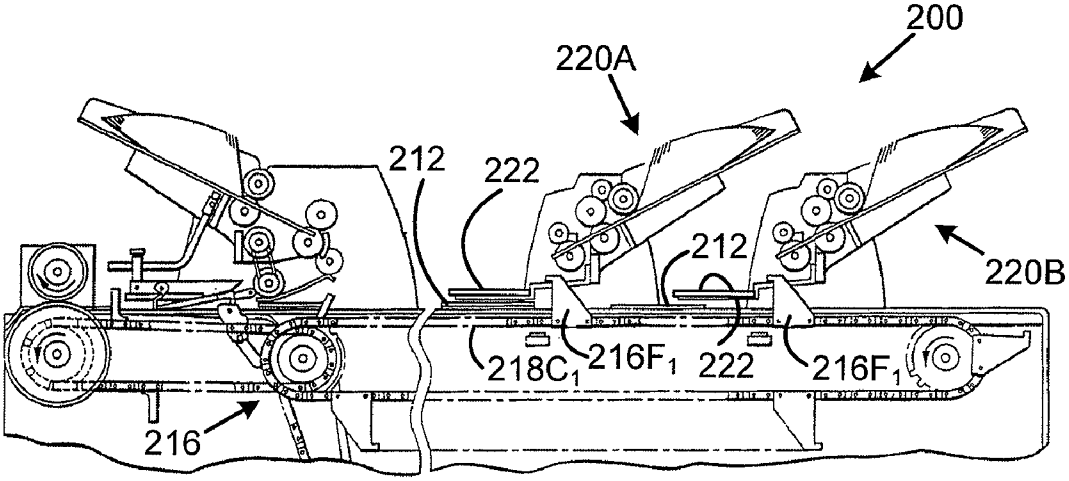
FIG. 1b ( PRIOR ART )
FIG. 1*b* is a profile view of the prior art chassis drive mechanism shown in FIG. 1*a* including feed mechanisms for building a sheet material collation.
Figure 1C:
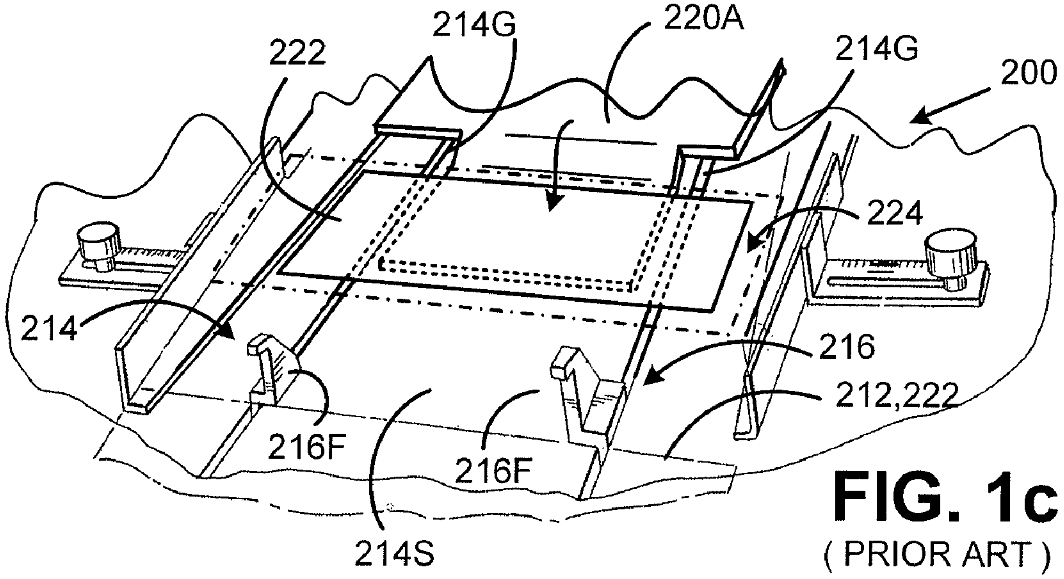
FIG. 1c ( PRIOR ART )
FIG. 1*c* is a broken-away isometric view of the prior art chassis drive mechanism of FIG. 1*a* to more clearly show chain driven fingers for conveying the sheet material collation along a transport deck.
Figure 2:
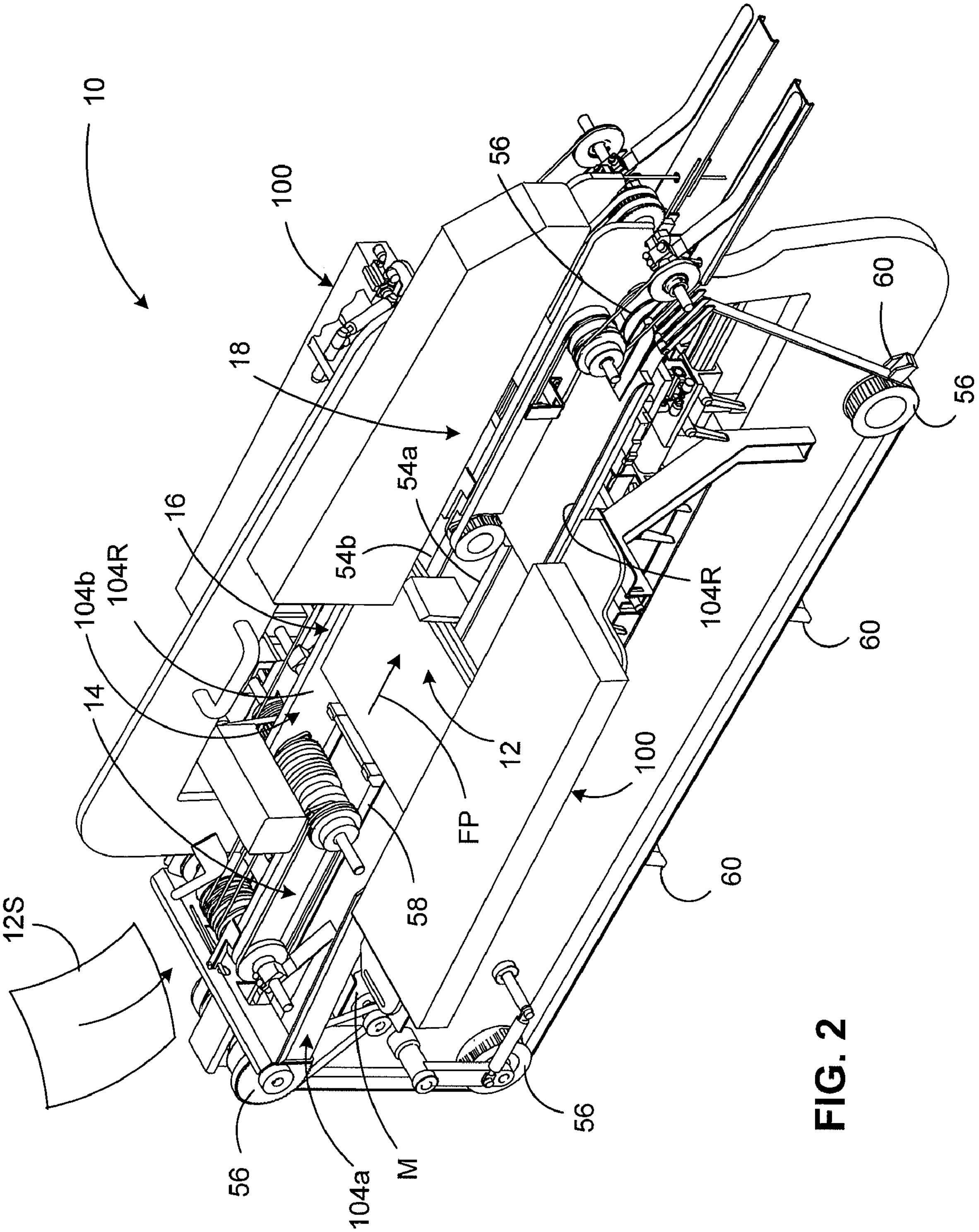
FIG. 2 is an isometric view of a stitcher/stapler module having a transport and alignment system including a pair of belts having pusher fingers to convey a multi-sheet collation along a feed path, and a system of alignment mechanisms disposed alongside and between the fingers to jog and align the edges of the collation.
Figure 3:
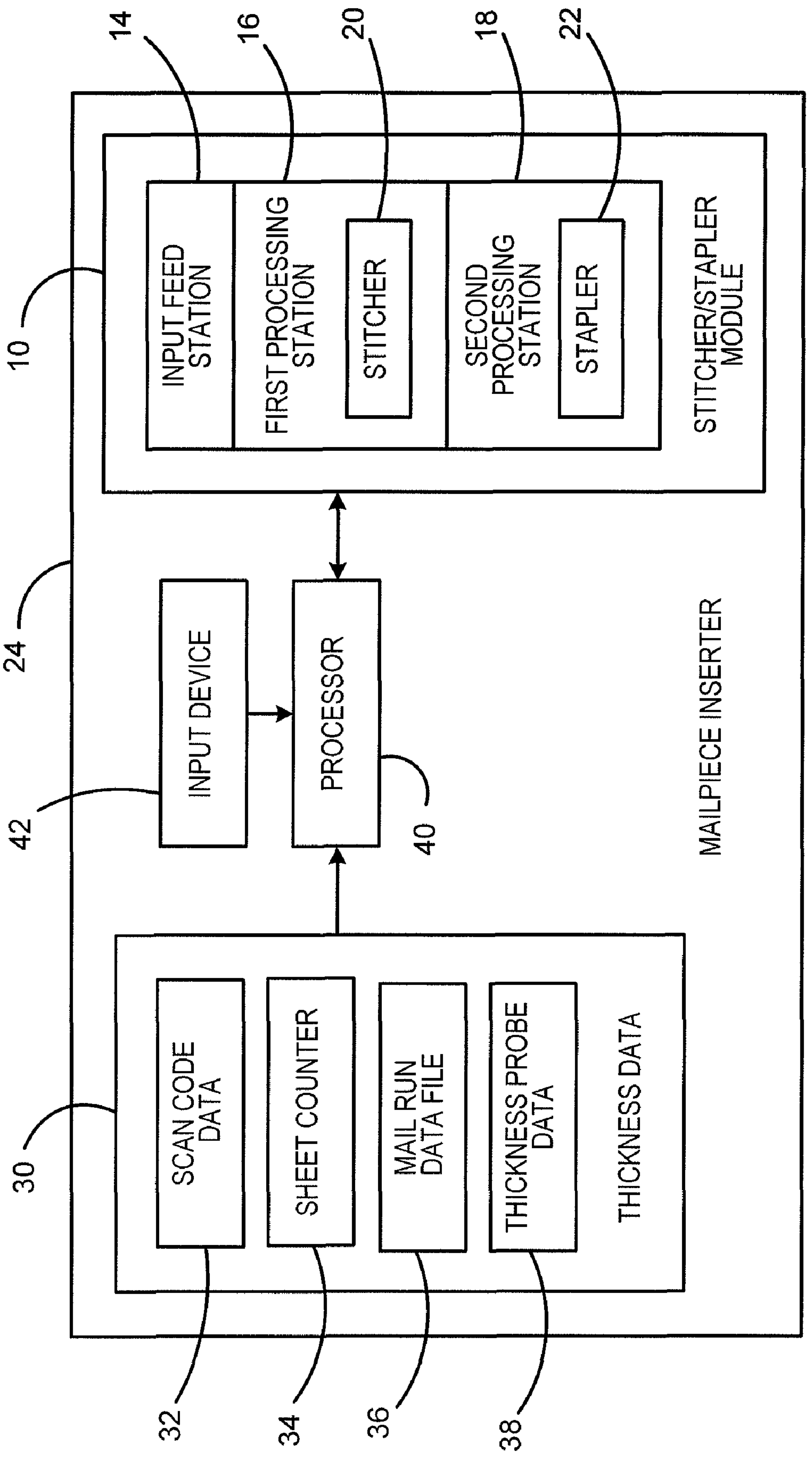
FIG. 3 is a block diagram of various components of a mailpiece inserter system including a processor for controlling the operation of a stitcher/stapler module and processing thickness data/sheet count information derived from one of a variety of sources.

In FIGS. 2 and 3, a stitcher/stapler 10 is adapted to stack, transport, align and bind consecutive multi-sheet collations 12 which vary in thickness. That is, the stitcher/stapler 10 is adapted to process consecutive collations which comprise as few as two (2) sheets to as many as one-hundred and fifty (150) sheets. It should be appreciated, however, that total number of sheets in a particular collation will generally be governed by the ability of a processing station to bind sheet material.

In the described embodiment, the stitcher/stapler 10 includes three serially-arranged processing stations including an feed input station 14, a first processing station 16, and a second processing station 18 The stitcher/stapler 10 receives sheet material 12S from an upstream module (not shown) of a sheet handling apparatus, e.g., a mailpiece inserter 24 (see FIG. 3), and accumulates/stacks of sheet material at the feed input station 14. The thickness of the multi-sheet collation 12 is determined to ascertain which of the subsequent processing stations 16, 18 will be most effective to bind the multi-sheet collation 12. The first processing station 16, immediately downstream of the feed input station 14, includes a stitcher 20 (described and illustrated in greater detail below) to bind the collation by a variable length "stitch", i.e., a length of wire which is cut/formed to produce a pair of prongs connected by a central web (similar to a staple, however, the ends of each prong are not sheared so as to form a penetrating point). The second processing station 18 includes a stapler 22 which binds the collation by a fixed length "staple", i.e., a conventional U-shaped fastener having a pair of penetrating legs connected by a central crown.

The principle difference between the two, i.e., the stitcher 20 of the first processing station 16 and the stapler 22 of the second processing station 18, relates to the capacity and/or ability of each to bind a collation. The stitcher 20 provides the capability to bind many collations before a requirement to reload a supply of stitching wire. That is, the stitcher 20 employs a relatively large spool of wire to provide a large supply of stitching material to bind multiple collations/documents. However, due to the requirement to shape each stitch from a supply of wire spool, the gauge of the wire and/or its yield strength properties, must be relatively low to facilitate the formation of the stitch, i.e., bending the wire to shape. A stapler 22, on the other hand, provides the ability to bind thick collations, e.g., a thickness greater than about forty-five thousands of an inch (0.45") or greater than about ninety (90) sheets of bond grade paper, but is limited in terms of the number of collations/documents that can be bound. With respect to the latter, the staples, which are "preformed", are fabricated from high yield strength, high stiffness materials. As a result, the legs of each staple can be fabricated to a length sufficient to penetrate thick collations without buckling. However, since the staples are preformed and packaged in strips having a finite number, only a small number of collations may be bound before the stapler 22 must be reloaded. In view of these differences, the stitcher/stapler module 10 of the present invention obtains information concerning the thickness of the multi-sheet collation such that each may be directed to the most appropriate downstream station for subsequent processing. This feature is discussed in greater detail in the subsequent paragraphs.

In FIG. 3, thickness/sheet count information 30 is used for several operations of the stitcher/stapler 10 including operations which: (i) select the processing station 16, 18 best suited to bind the collation 12, (ii) control the transport and alignment of the multi-sheet collations 12 at each of the processing stations 16, 18, and (iii) control the stitching operation at the first processing station 16 (i.e., the length of stitch, spacing between the anvil/clincher and the striker/ram, etc.) Specifically, the thickness information 30 may be obtained by (i) reading a scan code data 32 printed on the first sheet of the multi-sheet collation 12, (ii) employing a sheet counter 34 in combination with sheet thickness data input by an operator, (iii) obtaining the number of sheets directly from the job data 36 of the mail run (i.e., from the application program code which generates each sheet printed in the mail run), (iv) directly measuring the thickness via a thickness measurement probe 38, once the collation 12 has been stacked. In the described embodiment, a scanner (not shown), upstream of the stitcher/stapler module 10, reads the scan code data 32 to obtain the number of sheets contained in the collation 12. A processor 40, controlling the operation of the mail piece inserter 24 (including the stitcher/stapler module 10), determines the thickness of the collation 12 as the product of the number of individual sheets 12S multiplied by the thickness of each sheet. An operator may be prompted i.e., via a keyboard or other input device 42 to enter the type or characteristics (i.e., weight, bond, copy, etc.), of the sheet material such that the processor 40 may calculate the thickness of the collation 12 to be bound.

The processor 40 uses the thickness data/sheet count information to convey the multi-sheet collation 12 from the input feed station 14 to the stitcher 20 at the first processing station 16, or to the stapler 22 at the second processing station 18. That is, the processor 40 is responsive to a thickness value signal TS and, if the thickness of the collation is greater than (or less than) a threshold value (X), the collation 12 is transported to one of the processing stations 16, 18. In the described embodiment, if it is determined that the collation 12 is less than or equal to about forty-five thousands inches (0.45") in thickness, the collation 12 is transported to the first station 16 for processing. Therein, the collation 12 is bound by the stitcher 20 which is capable of varying the length of the stitch such that the stitch optimally extends through the collation. That is, the wire of the stitcher 20 is cut to a length such that the prongs thereof extends through the collation and the anvil of the stitcher 20 clinches the ends to an optimal length, i.e., sufficiently long to capture all of the sheets without overlapping the ends of each prong. In the described embodiment, the stitcher 20 is capable of varying the length of each stitch, i.e., from one collation to a subsequent collation. While this aspect of the invention will be discussed in greater detail below i.e., when describing the reconfigurable stitcher illustrated in FIGS. 8*a* though 8*d*, suffice it to say at this juncture, that the stitcher 20 is adapted to: (i) vary the length of the wire which forms each stitch, (ii) center the web relative to the striker/ram which drives the stitch through the collation, and (iii) vary the strike distance i.e., the distance between the striker/ram and the anvil.

If it is determined that the thickness of the collation 12 is greater than about forty-five thousands inches (0.45"), the collation 12 is transported to the second station 18 for processing. Therein, the collation 12 is bound by the stapler 22 which is capable of penetrating the thick collation without bending/buckling. That is, since each staple is fabricated from a high yield strength material, the legs of each staple are highly stabile in buckling and penetrate the collation without bending.

Transport and Alignment System for Producing Variable Thickness Collations

Figure 4:
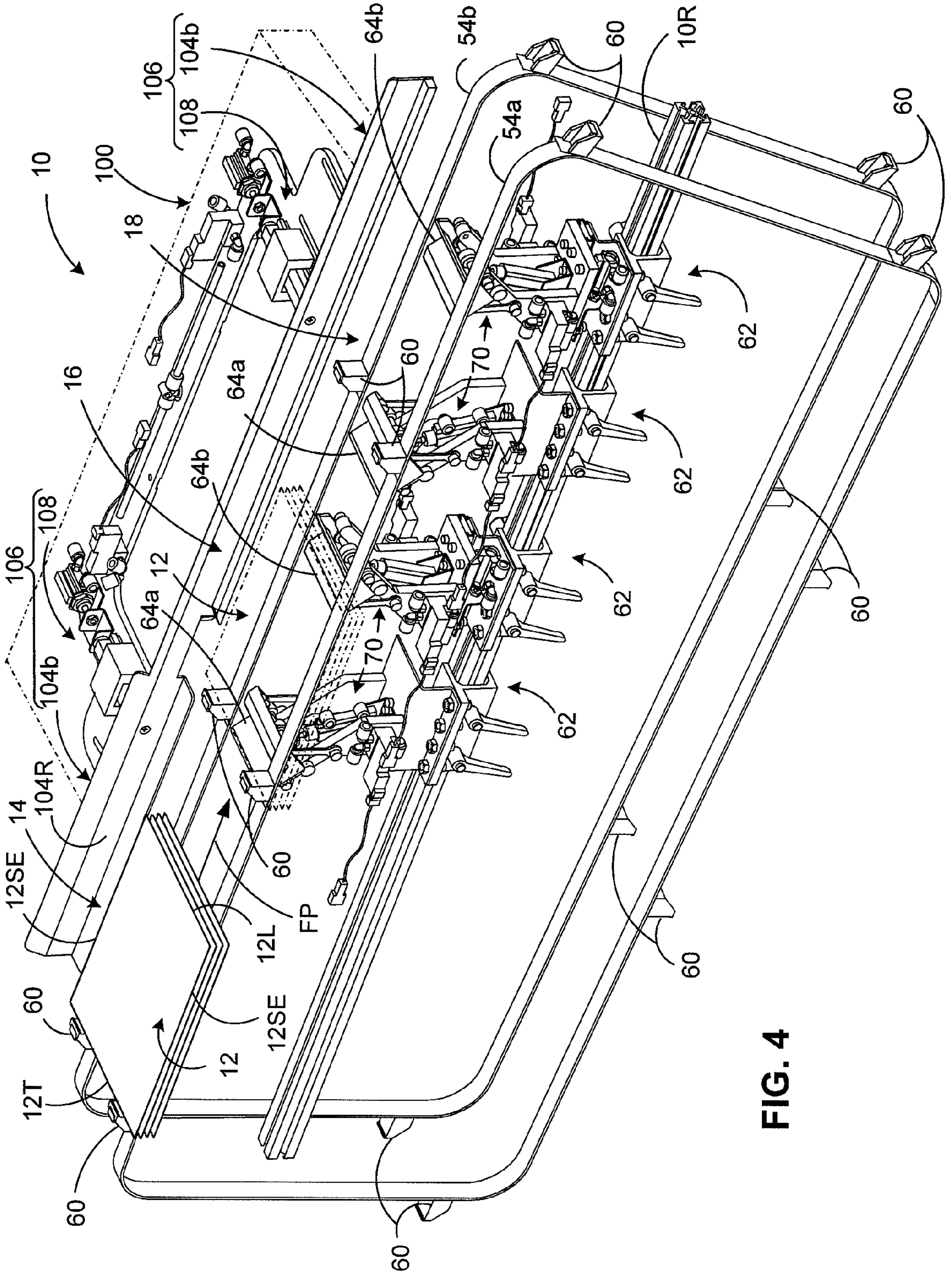
FIG. 4 is a broken away isometric view of the stitcher/stapler module of FIG. 2 to reveal the relevant details of the transport and alignment system including an feed input station for stacking a multi-sheet collation, and first and second processing stations disposed downstream of the feed input station for aligning the leading, trailing and lateral side edges of the multi-sheet collation.
Figure 5:
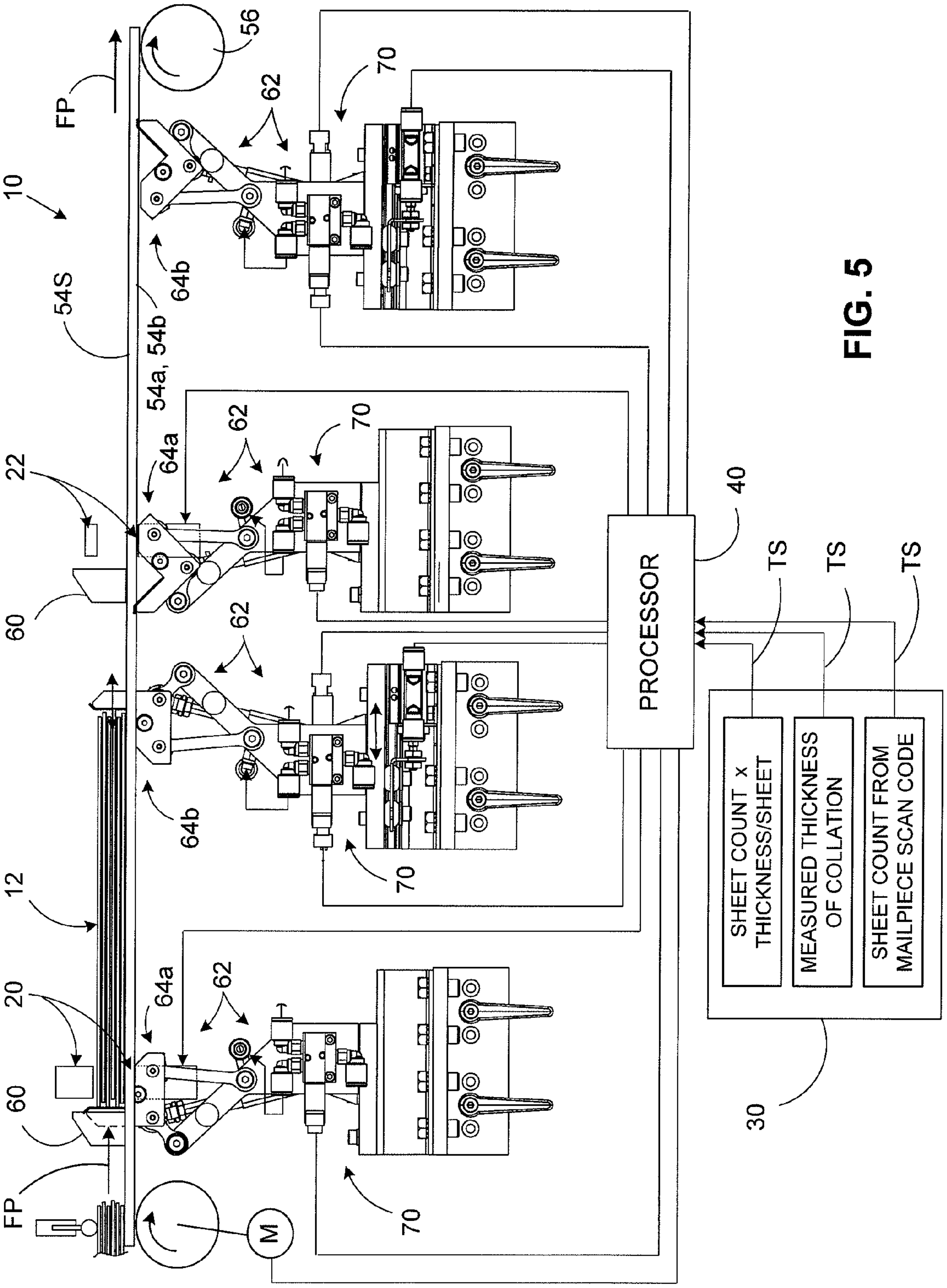
FIG. 5 is a schematic side view of the first and second processing stations each including pairs of repositionable alignment mechanisms which may be: (i) extended upward between the first and second conveyor belts to jog/align the leading and trailing edges of the multi-sheet collation, and (ii) retracted below the support surfaces of the conveyor belts to facilitate to transport along the feed path immediately prior to, and following alignment of, the multi-sheet collation.

As discussed above, the multi-sheet collation 12 is conveyed along a feed path FP of the stitcher/stapler 10 to one of the processing stations 16, 18 depending upon the collation thickness/sheet count information 30. In FIGS. 4 and 5, the transport and alignment system comprises first and second belts 54*a*, 54*b* (best seen in FIG. 4) which wrap around, and are driven by, a plurality of rolling elements 56. That is, one or more rotary drive motors M is coupled to, and drives, at least one of the rolling elements 56 associated with each of the belts 54*a*, 54*b*. In the described embodiment, the belts 54*a*, 54*b* are cogged to engage teeth disposed about the periphery of the rolling elements 56. The first and second belts 54*a*, 54*b* slideably engage, and are each supported by, a rigid support structure disposed beneath the respective belts 54*a*, 54*b* to mitigate catenation thereof between the rolling elements 56. In the described embodiment, the rigid support structures are elongate bars 58 (see FIG. 2) having a width dimension (transverse to the feed path FP of the collation 12) approximately equal to the width of each belt. As a consequence, the belts 54*a*, 54*b* and bars 58 define a space or gap therebetween to allow for binding apparatus, i.e., the stitcher 20 and stapler 22, to access the underside of the multi-sheet collation 12. Furthermore, the spacing between the first and second belts 54*a*, 54*b* mitigates skewing of the multi-sheet collation 12.

Each of the belts 54*a*, 54*b* includes a plurality of spaced-apart fingers 60 which are aligned along the conveyance/feed path FP to convey the multi-sheet collation 12 from the feed input station 14 to one of the downstream processing stations 16, 18. The fingers 60 project upwardly, i.e., orthogonally, from each of the belts 54*a*, 54*b* and engage the trailing edge 12T of the multi-sheet collation 20 at two points. Furthermore, the belts 54*a*, 54*b* are aligned across the feed path FP and driven in unison to "push" the collation 12 along the feed path FP to one of the two processing stations 16, 18.

In FIGS. 4 and 5, perspective and side views, respectively, of the belts 54*a*, 54*b* are shown to reveal opposing alignment mechanisms 62*a*, 62*b* comprising pairs of registration members 64*a*, 64*b* disposed along the feed path FP and between the first and second conveyor belts 54*a*, 54*b*. Functionally, the alignment mechanisms 62*a*, 62*b* are operative to align the opposed edges, e.g., leading and trailing edges, of the multi-sheet collation 12 as each collation comes to rest at one of the processing stations 16, 18. Once aligned, the collation 12 is bound by either the stitcher 20 or stapler 22, depending upon which processing station 16, 18 has been selected to bind the collation 12, i.e., as determined by the processor 40.

More specifically, and referring FIGS. 4, 5, and 6*a* through 7*b*, each of the registration members 64*a*, 64*b* extends transversely across the feed path FP and has a generally L-shaped cross section defined by a base 66 and a registration wall 68 disposed orthogonally from the base 66. Each registration wall 68 defines a registration surface 68R which is repositionable from an idle position (shown in dashed lines in FIG. 6*b*), below the support surface 54S (also referred to as the "transport deck") of each of the belts 54*a*, 54*b*, to an active position (shown in solid lines in FIG. 6*b*) above the support surface 54S of the belts 54*a*, 54*b*. In the idle position, the collation 12 moves over one or both of the registration members 64*a*, 64*b* and may be conveyed from the feed input station 14 to either of first or second processing stations 16, 18. Alternatively, with all of the registration members 64*a*, 64*b* in the idle position, the collation 12 may be conveyed across the entire stitcher/stapler 10 to another downstream processing station, i.e., without being bound at either the first or second processing stations 16, 18.

In the active position, at least one of the registration members 64*a*, 64*b* is adapted to oscillate forward and aft, i.e., along the feed path FP, to align the edges of the collation 12. In the described embodiment, the downstream registration member 64*b* (see FIGS. 4 and 7*b*) of each pair, i.e., the registration member 64*b* in contact with the leading edge 12L of the collation 12, oscillates forward and aft to align the sheets of the collation 12. Although, it should be appreciated that either or both of the registration members 64*a*, 64*b* may be displaced to align the collation 12.

To ensure complete and accurate registration of large collations, e.g., those having more than ninety (90) sheets or having a thickness greater than about 0.3 inches, the downstream registration member 64*b* of each pair oscillates for eight (8) cycles and is displaced a distance of about 0.25 inches with each cycle. However, to increase throughput, i.e., the number of collations processed (i.e., bound via the stitcher 20 or stapler 22), the number of cycles may be varied depending upon the thickness of the collation 12. For example, a collation 12 having as few as ten (10) sheets, or a thickness less than about 0.1 inches, the registration member 64*b* may be cycled three (3) times. Similar to the selection of the appropriate processing station 16, 18, thickness data 30, or the number of sheets in each collation 12, is used by the stitcher/stapler module 10 to determine the optimum number of cycles for aligning the sheets of each collation 12. That is, the processor 40 acquires the thickness information 30 and varies the number of cycles depending upon the collation thickness or sheet count.

To further improve throughput, the processor 40 may control the conveyance system, (i.e., the belts 54*a*, 54*b*, rolling elements 56 and drive motor M), to use the first and second processing stations 16, 18 as buffer stations. That is, when the stitcher/stapler 10 is not active, i.e., functioning only as a transport system, the processing stations 16, 18 may serve to hold/retain collations 12 (unbound collations) so that other mailpiece inserter stations e.g., folding, insertion and/or print stations (not shown) downstream of the first and second processing stations 16, 18 may process the mailpiece content material.

In FIGS. 5 through 7*b*, each of the registration members 64*a*, 64*b* pivotally mounts to a first displacement mechanism 70 operative to: (i) raise and lower the registration members 64*a*, 64*b* into and out of the idle and active positions, and (ii) oscillate at least one of the registration members 64*a*, 64*b* to align the sheets of the collation 12. In the described embodiment, the displacement mechanism 70 comprises a plurality of links 72, 74 pivotally mounting at one end to an intermediate fitting 76, and pivotally mounting at the other end to the base 66 of a respective one of the registration members 64*a*, 64*b*. The intermediate fitting 76 includes a mounting plate 78 and at least one arm 80*a* projecting upwardly therefrom. In the described embodiment, the intermediated fitting 76 includes a pair of clevis arms 80*a*, 80*b* projecting from each side of the mounting plate 78 for additional stability.

The mounting plate 78 of each intermediate fitting 76 is mounted to a center rail 10R (see FIG. 4) of the stitcher/stapler 10 by a clamp attachment 82. As such, the entire displacement mechanism 70 and respective one of the registration members 64*a*, 64*b* may be released, repositioned, and reaffixed to the rail 10R via locking cams 84. That is, to facilitate adjustment of the registration members 64*a*, 64*b*, i.e., the spacing therebetween to accommodate dimensional changes in the size of collations 12, the locking cams 84 provide an ability to quickly disconnect/reconnect the displacement mechanism 70 along the center rail 10R.

Each displacement mechanism 70 includes a first pneumatic actuator 86 which is disposed between the base 66 of the respective registration member 64*a* or 64*b*, and the mounting plate 78. In the described embodiment, the first pneumatic actuator 86 includes a linear piston/cylinder disposed between the clevis arms 80*a*, 80*b* of the intermediate fitting 76. A pneumatic valve 88 provides pressurized air $PA_1$ (see FIG. 6*b*) to the actuator 86 of respective displacement mechanism 70 to displace the registration wall 68 into and out of the idle and active positions.

Figure 6A:
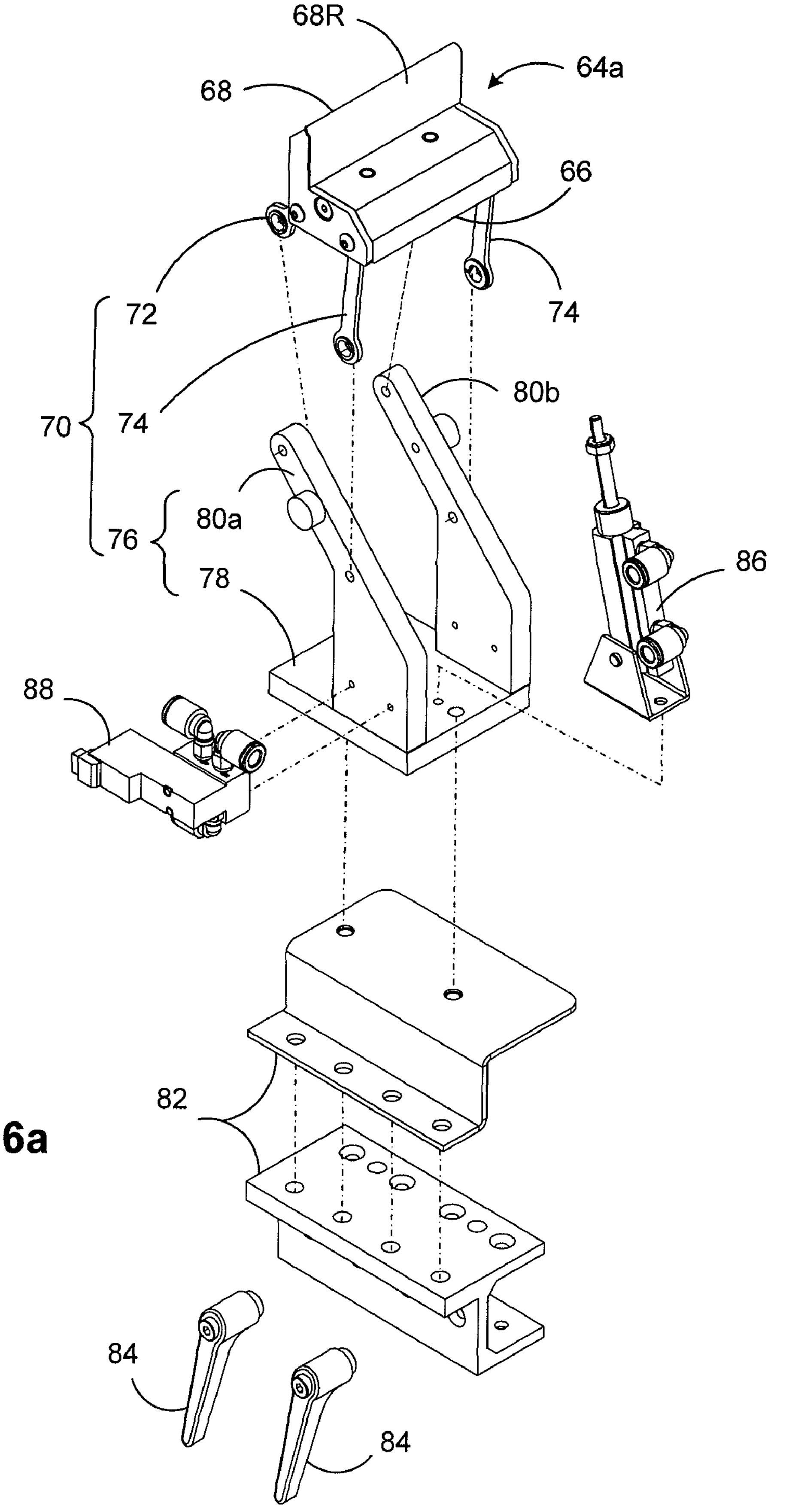
FIGS. 6*a* and 6*b* depict exploded and assembled views, respectively, of a typical trailing edge alignment mechanism including a four-bar linkage arrangement for displacing a registration member of the alignment mechanism from an idle position below the conveyor belts to an active position above the conveyor belts.
Figure 6B:
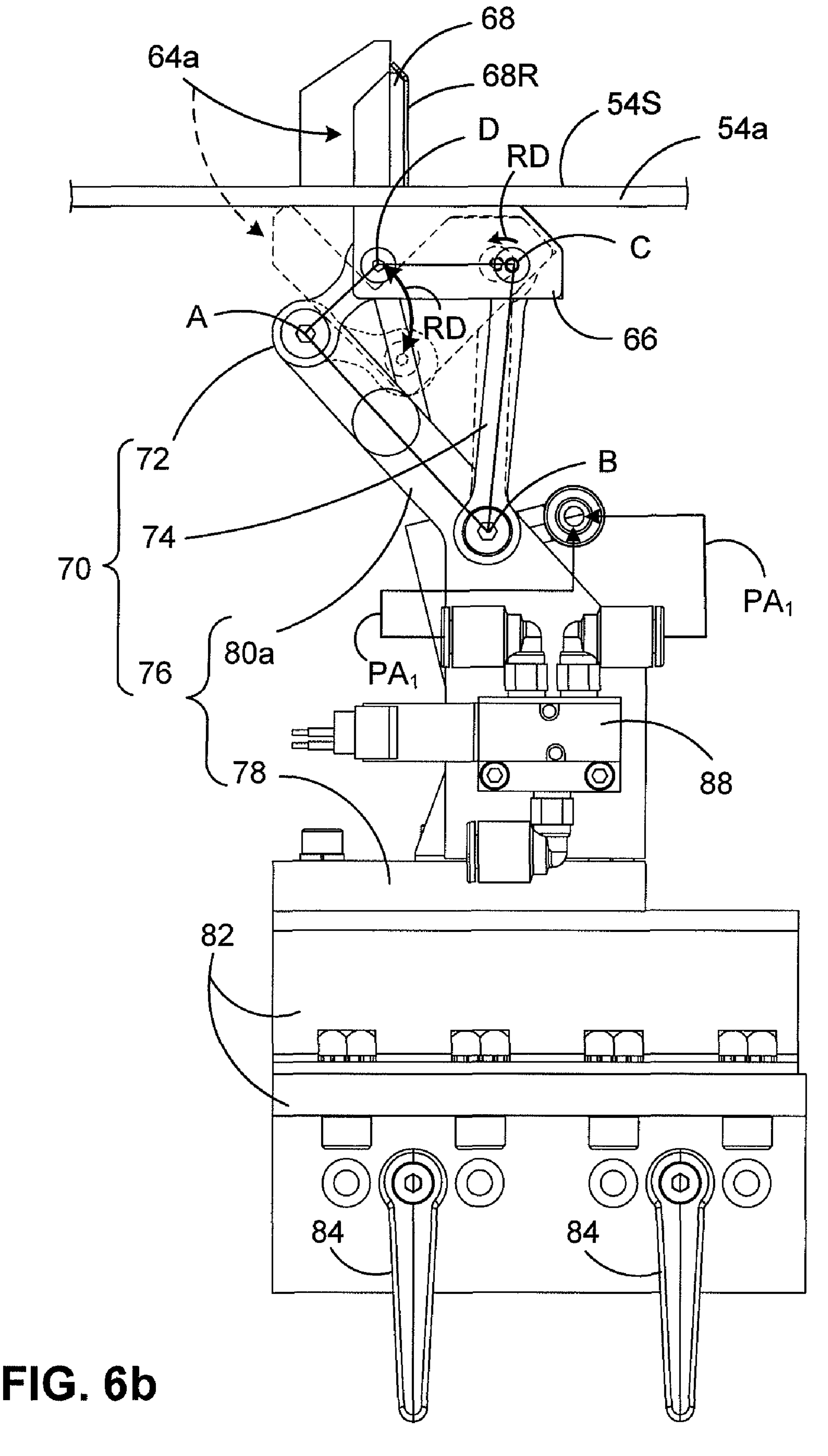

In FIG. 6*b*, an examination of the displacement mechanism 70 reveals that the links 72, 74, intermediate fitting 76, and base 66, produce a four-bar linkage defined by line segments AB, BC, CD and DA. The four-bar linkage arrangement can be configured, i.e., depending upon the length of the links 72, 74 and the location of the respective pivot points A, B, C, D, to perform the dual functions of rotation and translation of the respective one of the registration members 64*a*, 64*b*. That is, the four-bar linkage arrangement can displace the respective one of the registration members 64*a*, 64*b* to rotate above and below the surface 54S of the belts 54*a*, 54*b* while also producing a substantially linear displacement i.e., forward and aft along the feed path FP, to jog and align the edges 12L, 12E of the collation 12. With respect to the latter, such linear displacement will be accompanied by a small angular displacement, which, depending upon the geometry of the stitcher/stapler 10, may or may not be tolerated.

Figure 7A:
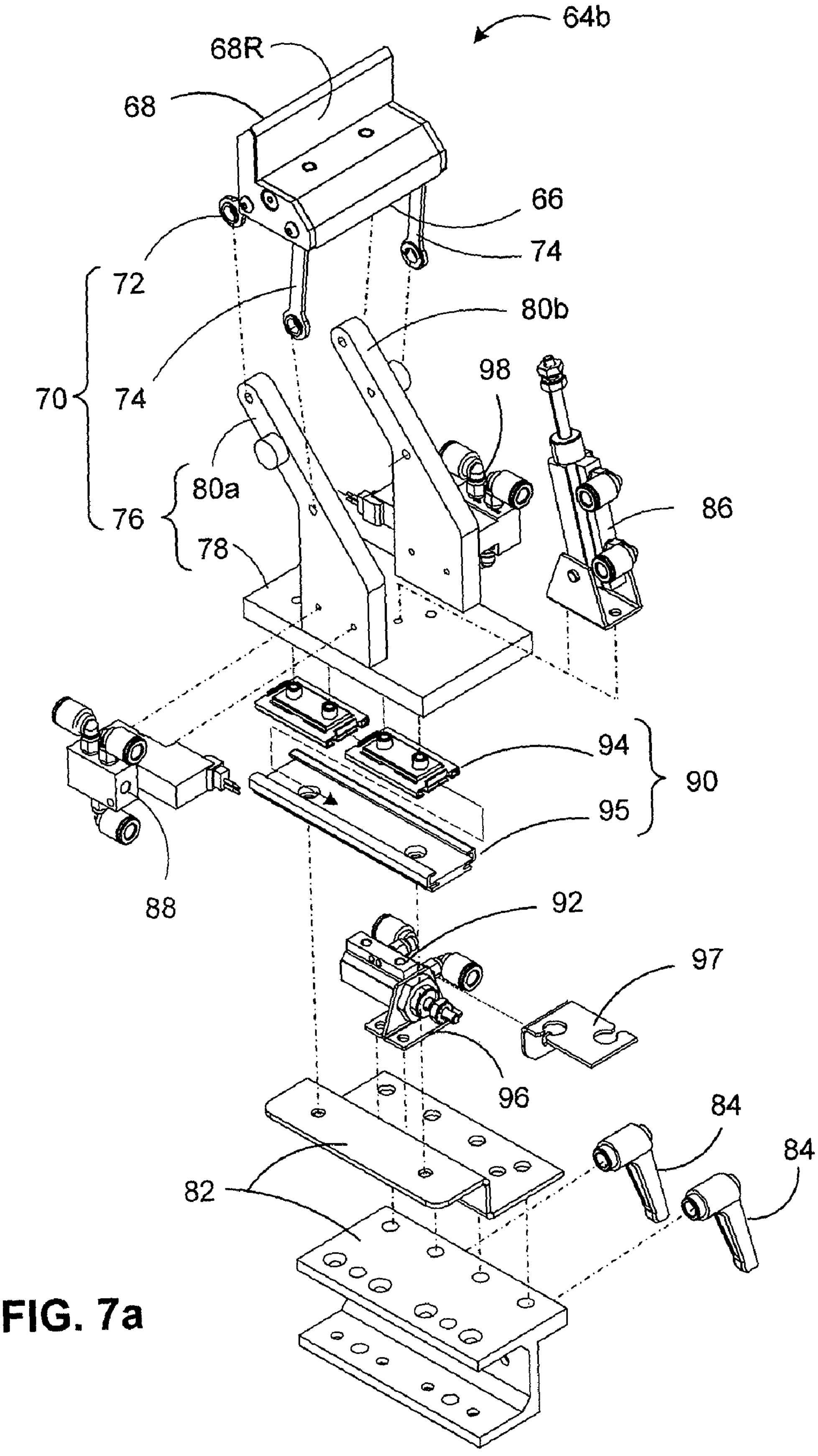
FIGS. 7*a* and 7*b* depict exploded and assembled views, respectively, of a typical leading edge alignment mechanism including a four-bar linkage arrangement for displacing the registration member from the idle to active positions, and a linear guide/actuator assembly for imparting pure linear motion to the registration member when jogging the multi-sheet collation during alignment operations.
Figure 7B:
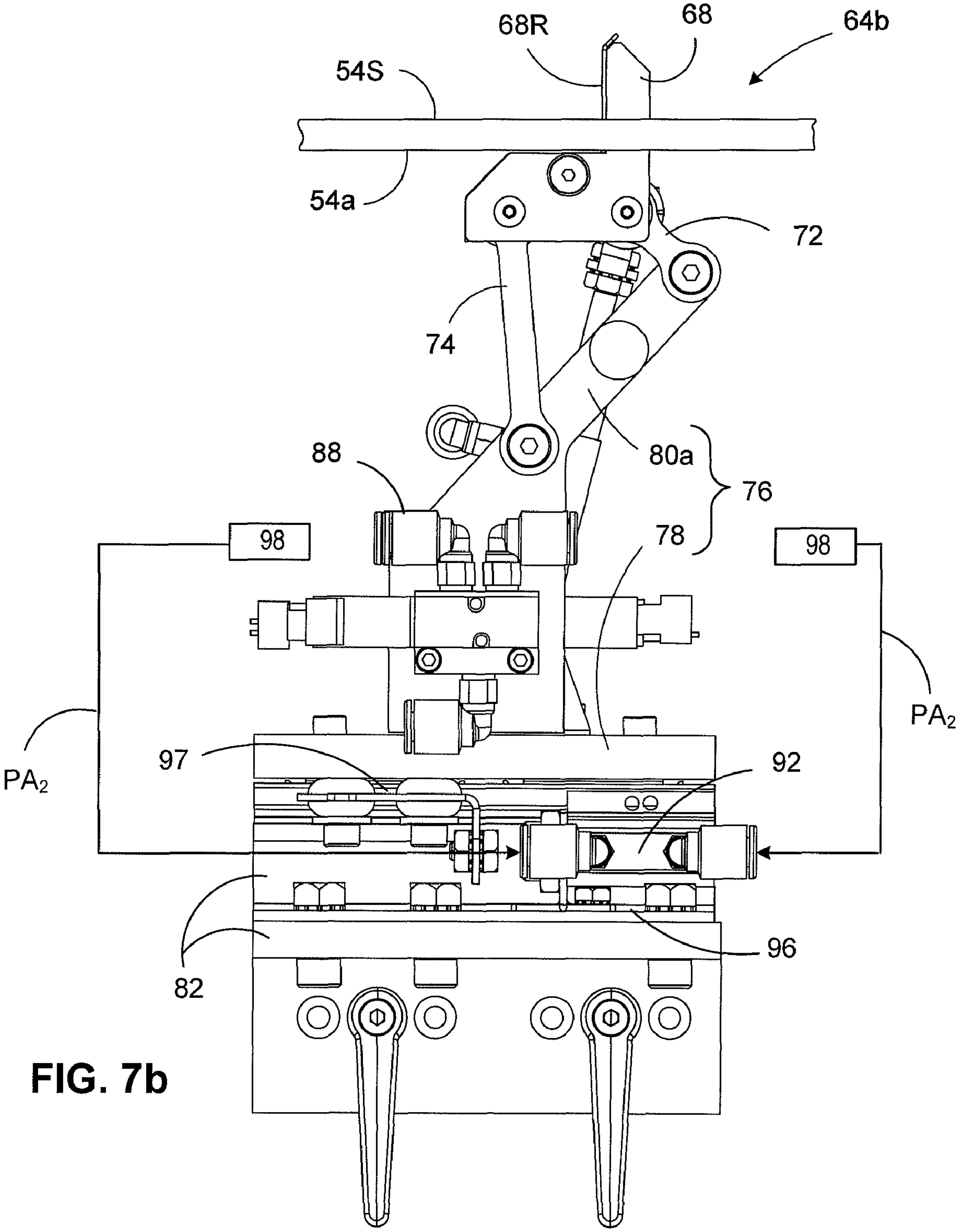

In FIGS. 7*a* and 7*b*, pure linear translation of the displacement mechanism 70 may be effected by a linear guide 90 disposed in combination with a second pneumatic actuator 92. More specifically, the linear guide 90 is disposed between the intermediate fitting 76 and the clamp attachment 82 and includes at least one sled fitting 94 affixed to the underside of the intermediate fitting 76, i.e., to the underside of the mounting plate 78, for slideably engaging a linear guide rail 95 affixed to an upper surface of the clamp attachment 82. The second pneumatic actuator 92 is attached at one end, via a flange fitting 96, to the clamp attachment 82, and at the other end, via a bracket 97, to the underside of the mounting plate 78. A pneumatic valve 98 provides pressurized air $PA_2$ (see FIG. 7*b*)*to* the second pneumatic actuator 92 to effect linear translation of the displacement mechanism within the linear guide 90. Recalling that only the registration members 64*b* associated with the leading edge of the collation 12 may be used to jog the collation 12, only the displacement mechanism 70 associated with downstream registration member 64*b*, associate with each processing station 16, 18 may be adapted to include the linear guide 90 and pneumatic actuator 92.

Thus far, the transport and alignment system has been described in the context of a stitcher/stapler 10 having a requirement to jog and align the leading and trailing edges of the multi-sheet collation 12. While the transport and alignment system may employ conventional alignment devices/apparatus for guiding/aligning the lateral side edges of the collation 12, e.g., rotating cams or converging side rails (not shown), the present invention employs a novel side registration system 100, seen in FIGS. 2 and 4, which spans all of the processing stations, i.e., the feed input station 14, and the first and second processing stations 16, 18. More specifically, the side registration system 100 comprises a second pair of registration members 104*a*, 104*b* each having registration surfaces 104R (only one of the registration members 104*b* is shown in FIG. 4) disposed adjacent each of the first and second conveyor belts 54*a*, 54*b*. The registration members 104*a*, 104*b* extend the length of the processing stations 14, 16, 18 and, similar to the first pair of registration members 64*a*, 64*b*, have a generally L-shaped cross sectional configuration. The spacing between the registration members 104*a*, 104*b*, i.e., the spacing across the feed path FP, may be adjusted to accommodate collations 12 which may vary in width dimension. Inasmuch as these registration members 104*a*, 104*b* do not cross the feed path, there is no requirement to raise or lower each relative to the surface 54S of the conveyor belts 54*a*, 54*b*. On the other hand, similar to the first pair of registration members 64*a*, 64*b*, at least one of the second pair of registration members 104*a*, 104*b* is adapted to oscillate in a transverse direction, i.e., toward and away from the conveyor belts 54*a*, 54*b* to align the side edges 12SE of the multi-sheet collation 12. Although, it should be appreciated that either or both of the registration members 104*a*, 104*b* may be displaced to align the side edges 12SE of the collation 12.

In the described embodiment, a second displacement mechanism 106 is attached to each of the registration members 104*a*, 104*b* and at least one of the second displacement mechanisms 106 is operative to oscillate and jog the side edges of the multi-sheet collation 12. While the second displacement mechanism 106 and registration members 104*a*, 104*b* may function to align the side edges 12SE at any or all of the processing stations 14, 16, 18, side registration of a collation 12 will generally commence at either the first or second processing stations 16, 18 where the collation 12 will be bound, i.e., by the stitcher 20, or stapler 22. Similar to the first pair of registration members 64*a*, 64*b*, at least one of the second pair of registration members 104*a* or 104*b* is operative to cyclically or repetitively engage a lateral side edge 12SE of the collation 12. In the described embodiment, the displacement of each oscillation for aligning the side edges 12SE will be about 0.25 inches, i.e., the same as the displacement required for aligning the leading and trailing edges 12L, 12T. The other of the registration members 104*a*, or 104*b* remains essentially stationary to react the impact forces generated by the opposing one of the registration members 104*a*, 104*b*. With respect to the latter, the second displacement mechanism 106 associated therewith is principally operational to adjust the location of the respective one of the displacement mechanisms 106.

The processor 40 controls the second displacement mechanisms 106 associated with the side registration system 100, i.e., to oscillate at least one of second pair of registration members 104*a*, 104*b*, using the same thickness data 30 or sheet count information obtained for cycling the first displacement mechanism 70. That is, should the thickness data 30 or sheet count require eight (8) cycles by one or both of the first displacement mechanism 70, e.g., collations 12 having more than ninety (90) sheets, then the processor 40 will command one or both of the second displacement mechanisms 106 to cycle by an equivalent number. Similarly, should the thickness data 30 or sheet count require three (3) cycles, the processor 40 will control the second displacement mechanism 106 accordingly. The number of cycles will generally decrease from a maximum of about eight (8) cycles to a minimum of about three (3) cycles as the thickness/sheet count, of the collation 12 decreases from greater than about ninety (90) sheets to a minimum of two (2) sheets. It will be recalled that such variation in the number of cycles, i.e., as a function of the collation thickness/sheet count, serves to optimize throughput.

The second displacement mechanism 106 may use any of a variety of actuators to displace and cycle the registration members 104*a*, 104*b*. In the described embodiment, the second displacement mechanism 106 employs a pair of linear actuators 108 (see FIG. 4) disposed at each end of the respective one of the registration members 104*a*, 104*b* to ensure proper alignment of the collation 12, whether the collation 12 is processed at the first or second processing stations 16, 18.

Reconfigurable Stitcher for Binding Consecutive Variable Thickness Collations

As previously discussed, the thickness data/sheet count information 30 is used to control the stitching operation at the first processing station 16. The thickness data/sheet count 30 may be generated by any of a variety of modules/sensor of the mailpiece inserter 24 or stitcher/stapler 10 including: (1) scan code data 32 (see FIG. 3) printed on a sheet of the mailpiece content material, e.g., the first sheet of each collation 12, (ii) a sheet counter 34 in combination with sheet thickness data input by an operator, (iii) mail run data 36, i.e., obtained directly from the application software (mail run data file) used to produce the content material, or (iv) a thickness measurement device, e.g., a thickness probe 38.

In FIGS. 8*a* through 8*d*, the stitcher 20 may be reconfigurable to vary the length of each binding stitch 120 based upon the thickness T of the multi-sheet collation 12. More specifically, the stitcher 20 comprises a stitch head 122 disposed beneath the collation 12 and a clinch head or anvil 124 disposed above the collation 12. Consequently, the stitcher 20 drives the prongs P (see FIG. 8*d*) of each binding stitch 120 upwardly through the lowermost or bottom sheet 12B while the clinch head 124 crimps the ends PE of each prong P against the top or uppermost sheet 12U of the collation 12. In the described embodiment, the stitch head 122 is disposed between the first and second conveyor belts 54*a*, 54*b*, though it will be appreciated that the stitch head may be disposed to either side of the belts 54*a*, 54*b*. Furthermore, while a single stitcher 20 is depicted, it will be appreciated that several stitchers 20 may be juxtaposed across the width, or disposed in tandem along the length, of the multi-sheet collation 12, to bind the collation 12 at several locations.

Figure 8A:
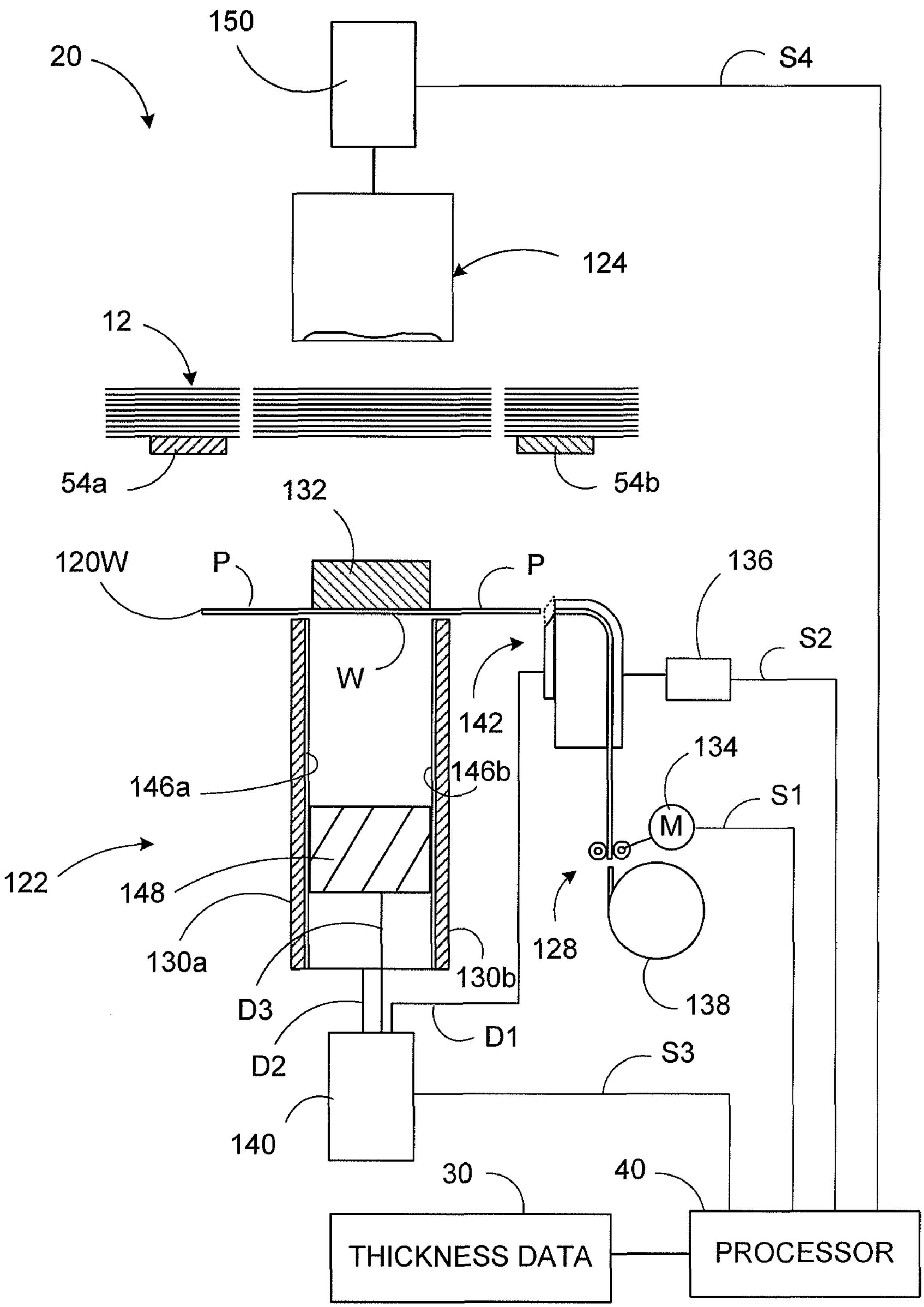
FIGS. 8*a* through 8*d* depict schematic views of a reconfigurable stitch head adapted to vary the length of each binding stitch based upon thickness data/sheet count information of the multi-sheet collation.

In FIG. 8*a*, the processor 40 receives thickness data 30 in connection with each collation 12 conveyed to the first processing station. The processor 40 uses this data/information 30 to determine the length of wire 120W used to generate the respective binding stitch 120, i.e., a stitch specifically tailored in length to bind a collation 12 of a particular thickness dimension T. The processor 40 issues a first signal to a first input actuator 134, i.e., a rotary actuator, which advances wire 120W, through the nip of a pair of rollers 128, and across a pair of spaced-apart bending beams 130*a*, 130*b* of the stitch head 122. Furthermore, the wire 120 is disposed beneath a forming block 132 which cooperates with the bending beams 130*a*, 130*b* to form the prongs P about the squared edges of the forming block 132. Wire to form the stitch 120 may be drawn from a conventional spool 138 mounted to the housing of the stitcher/stapler 10. In addition to the thickness T of the collation 12, which determines the minimum length of the prongs P required to penetrate the collation 12, other dimensions needed to perform this operation include: (i) the width of the web W, i.e., the length of wire between the prongs, and (ii) the end length LE (see FIG. 8*d*) of the prong end PE i.e., the portion protruding through, and securing the collation.

The processor 40 issues a second signal S2 to a second input actuator 140 to center the wire 120W across the bending beams 130*a*, 130*b*. Additionally, the processor 40 issues a third signal S3 to a third input actuator 142 to displace several components of the stitch head 122, i.e., internal structure of the stitch head 122 which forms the stitch 120, upwardly toward the underside of the collation 12. That is, as third input actuator 142 strokes upwardly, portions of the upward displacement, denoted by lines D1, D2 and D3 actuate one or more connected elements.

Figure 8B:
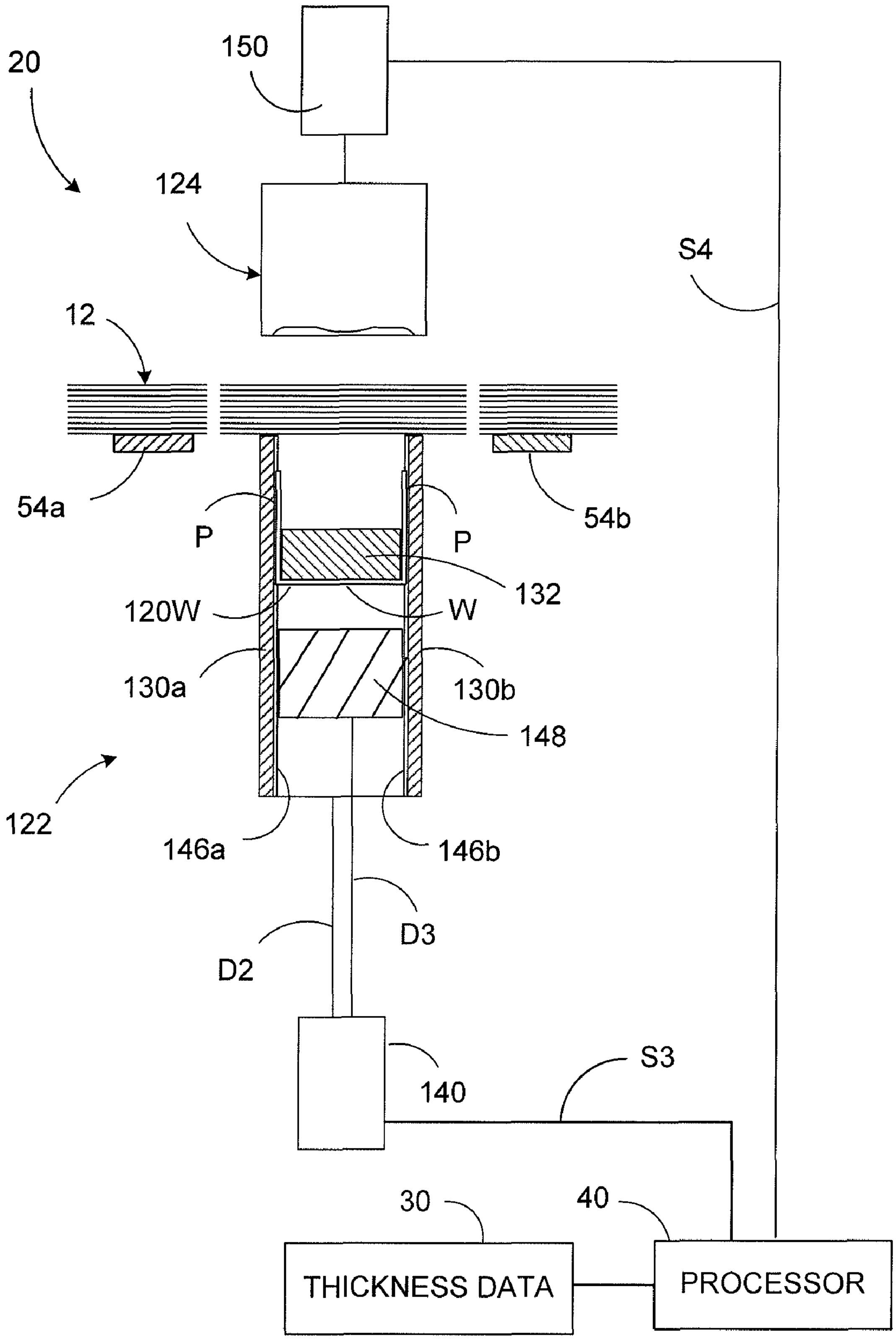

A first portion of the stroke D1 causes a shearing device 142 to cut the stitch wire 120W. This motion can be conveyed directly to the shearing device 142 or via cams connected to one of the bending beams 130*a*, 130*b*. In FIG. 8*b*, a second portion of the stroke D2 displaces the bending beams 130*a*, 130*b* upwardly. In this portion of the displacement, the stitch wire 120W falls, and is guided, within a pair of grooves 146*a*, 146*b* formed along the internal walls of the bending beams 130*a*, 103*b* to bend the stitch wire 120 about the squared ends of the forming block 132. In addition to guiding the prongs P, the internal grooves 146*a*, 146*a* provide buckling stability as the prongs P penetrate the collation 12.

Figure 8C:
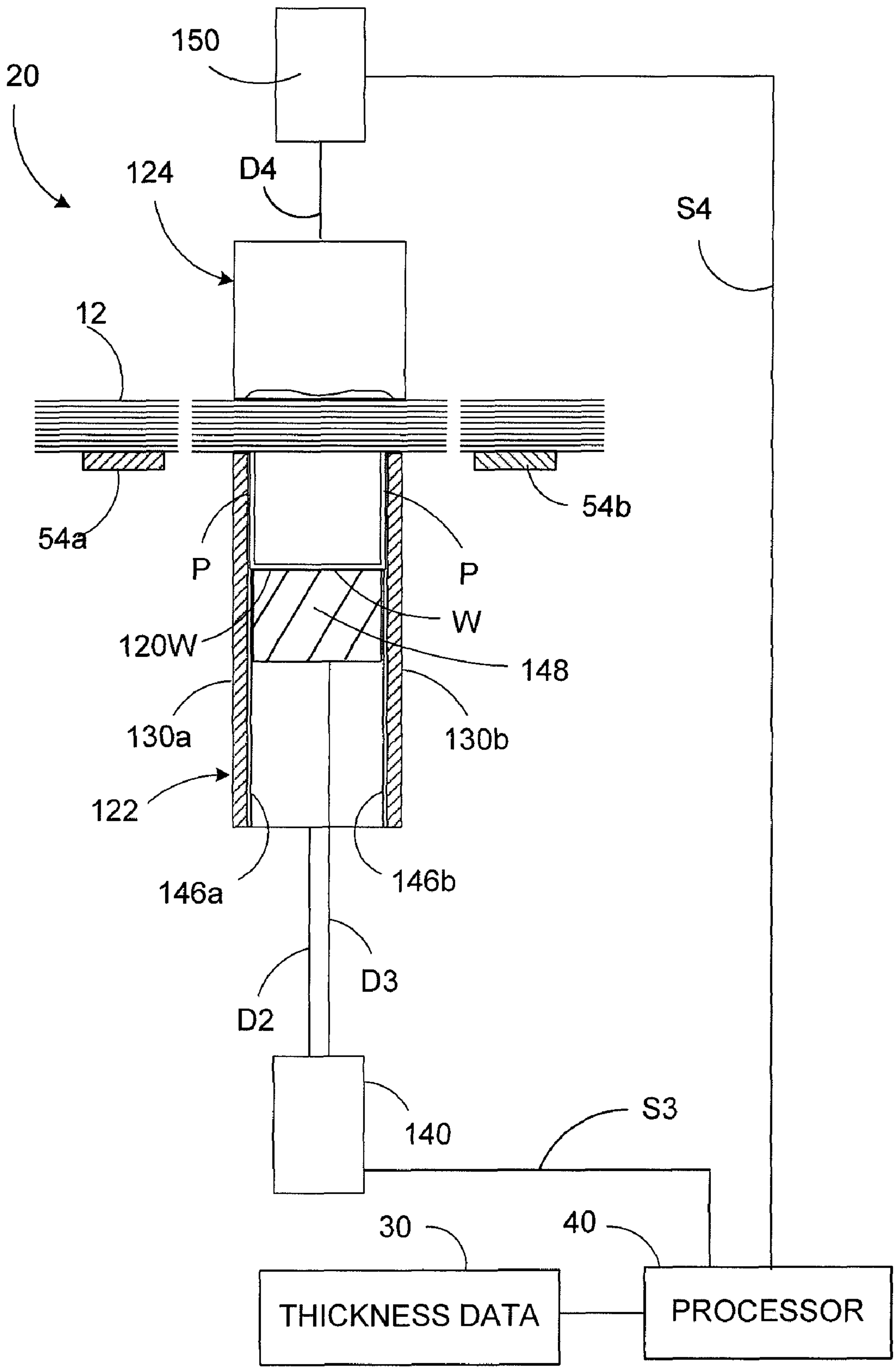

In FIGS. 8*b* and 8*c*, the displacement D2 also causes the forming block 132 (shown in FIG. 8*b*) to move away, (into or out of the plane of FIG. 8*c*) such that the web W is free to move upwardly in the subsequent portion of the stroke D3. The second portion of the stroke D2 terminates when the bending beams 130*a*, 130*b* abut the lowermost sheet of the collation 12. That is, the ends of each of the bending beams 130*a*, 130*b* define a reference surface which will be used by the processor 40 to position the anvil 124 relative to the stitch head 122. In the final or third portion of the stroke D3, a striker or ram 148 (see FIG. 8*c*) engages the web W of the stitch 120 to drive the prongs P though the collation 12. At the same time, i.e., while the lower portion of the stitcher 122 moves into position below the collation 12, the processor 40 issues a fourth signal S4 to a fourth input actuator 150 to lower the anvil or clincher 124, (a displacement denoted by line D4 in FIGS. 8*c* and 8*d*) against the uppermost sheet of the collation 12.

Figure 8D:
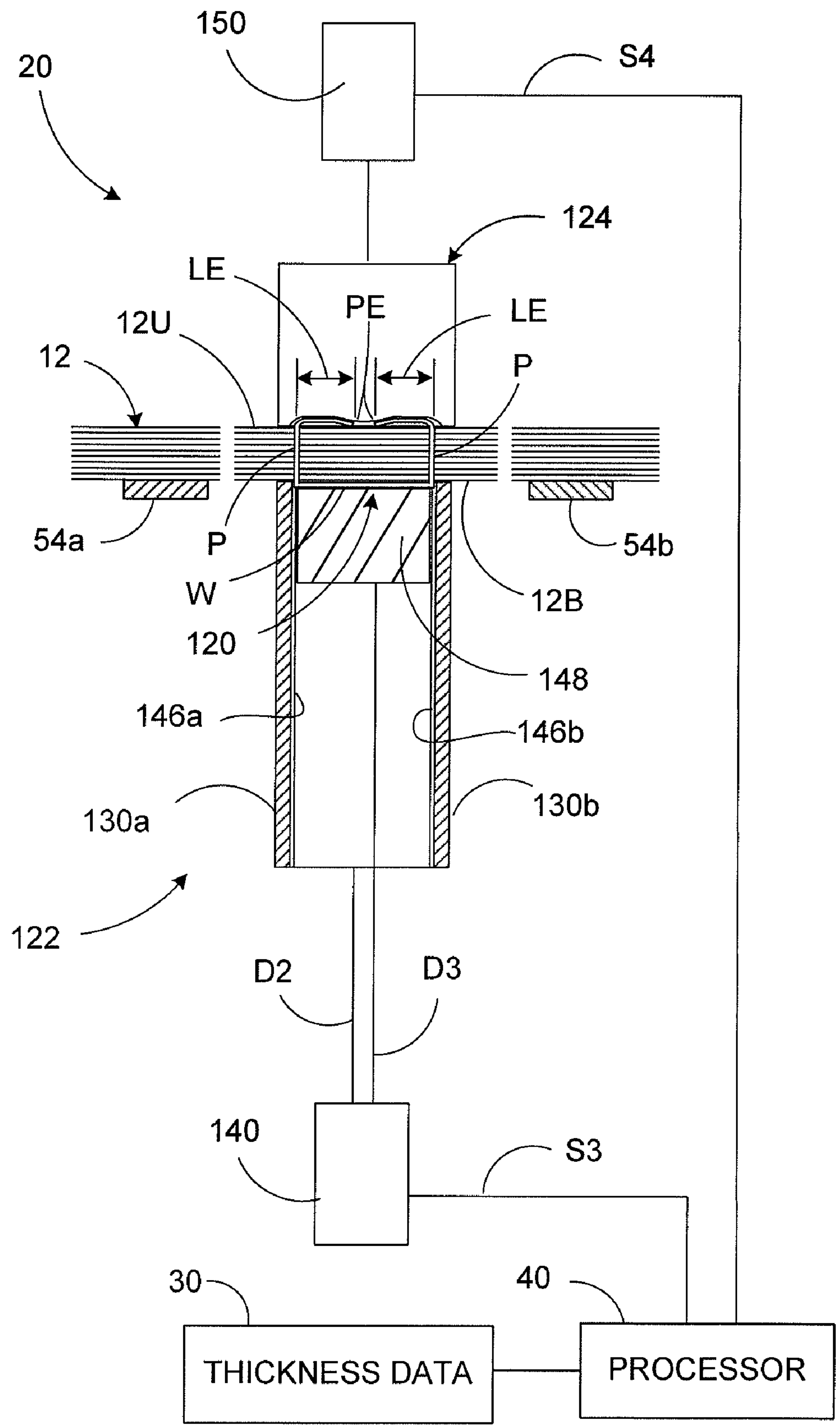

In FIG. 8*d*, the motion of the striker 148 causes the prongs P to penetrate the collation 12 and crimp/clinch the ends PE of each prong P. In the described embodiment, the clincher 150 includes arcuate surfaces for securing the ends PE of the prongs, however, other clinching devices, including those which actively recurve the ends PE of the prong P, are contemplated.

In summary, the various embodiments described herein feature a stitcher/stapler 10 and/or a mailpiece inserter 24 capable of binding multi-sheet collations which vary in thickness. The thickness data/sheet count information 30 may be derived from various sources including a scan code 32, sheet counter 34, mail run data file 36 or thickness input device 38. Throughput is enhanced by arranging the stations 14, 16, 18 in series and conveying a multi-sheet collation 12 to the apparatus, i.e., the stitcher 20 or stapler 22, best suited to bind the collation based upon the thickness of the collation 12. The serial arrangement of the processing stations 16, 18 is made possible by a transport and alignment system having alignment mechanisms which may be raised and lowered into and out of idle and active positions, i.e., such that the collation may pass across each of the serial arranged stations 16, 18.

Throughput is further enhanced by varying the number of cycles, i.e., oscillations associated with each registration of the registration members 64*a*, 64*b*, 104*a*, 104*b*, to align the leading, trailing and side edges 12L, 12T, 12SE of the collation 12. Finally, the stitcher 20 may also be reconfigured/adapted to vary the size of a binding stitch 120 to bind consecutive variable thickness collations. While prior art stitching apparatus must be adjusted manually to bind collations from one mail run to the next, e.g., stitching collations of a constant thickness for a multi-collation mail run, the stitcher 20 of the present invention is reconfigurable from one collation to the next in the same mail run. As a consequence, the stitcher/stapler 10, when used in the context of, or in combination with, a mailpiece inserter 24, is highly robust, adaptable and flexible i.e., in terms of the type and thickness of collations which can be produced.

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

What is claimed is:

1. A system for aligning multi-sheet collations, comprising:

- a conveyance system defining a transport deck for supporting and conveying a multi-sheet collation along a feed path;
- a first pair of registration members disposed orthogonal to the feed path and defining a processing station along the feed path, the registration members defining registration surfaces which are repositionable from an active position above the transport deck to an idle position below the transport deck;
- a first displacement mechanism adapted to raise and lower the registration members into and out of the active and idle positions, and oscillate at least one of the registration surfaces forward and aft in a direction parallel to the feed path when the registration member is in the active position;
- the conveyance system including first and second conveyor belts and wherein the registration member of each alignment device is disposed between the first and second conveyor belts, and
- a processor adapted to control the motion of the conveyance system relative to the registration members, and control the first displacement mechanism to (i) raise the registration surfaces into the active position, (ii) oscillate the registration surfaces to align the opposing edges of the multi-sheet collation, and (iii) lower the registration surfaces into the idle position to facilitate conveyance of the aligned multi-sheet collation along the feed path.

2. The system according to claim 1 wherein the opposed edges correspond to leading and trailing edges of the multi-sheet collation and further comprising:

- a side registration system operative to engage a side edge of the multi-sheet collation orthogonal to the leading and trailing edges thereof and including:
- a second pair of registration members parallel to the feed path and a second displacement mechanism adapted to oscillate a registration surface of at least one of the second pair of registration members to align the side edges of the multi-sheet collation, and
- wherein the processor is operative to control the motion of the second displacement mechanism to align the side edge of the multi-sheet collation into and out of displacement mechanism.

3. The system according to claim 2 wherein at least two of the first pairs of registration members are disposed along the feed path and define serially arranged processing stations, and wherein the second pair of registration members are adapted to align the lateral side edges of the multi-sheet collation at each of the processing stations.

4. The system according to claim 1 wherein the first pair of registration members each define a base and wherein the first displacement mechanism, in combination with the base of each registration member, defines a four-bar linkage arrangement adapted to raise and lower the registration members relative to the transport deck of the conveyance system.

5. The system according to claim 4 wherein one of the first pair of registration members and respective displacement mechanism engages one of the leading and trailing edges of the multi-sheet collation to align the edges thereof.

6. The system according to claim 1 wherein the first pair of registration members each define a base and wherein the first displacement mechanism, in combination with the base of each registration member, defines a four-bar linkage arrangement, the four bar linkage arrangement defined by a pair of links pivotally mounted to the base of each registration member at one end thereof and pivotally mounted to an intermediate fitting at the other end.

7. The system according to claim 6 wherein at least one of the first displacement mechanisms further includes a linear guide disposed between the intermediate fitting and a clamp attachment, and an actuator operative to effect linear translation of the displacement mechanism within the linear guide.

8. The system according to claim 6 wherein the intermediate fitting includes a pair of clevis arms connected by a substantially planar base and wherein a pair of links pivotally mount to each of the clevis arms at one end and to the base of the registration member at the other end and further comprising a linear actuator disposed between the planar base of the intermediate fitting and the underside of a respective registration member.

9. A mailpiece inserter operative to align variable thickness multi-sheet collations comprising:

- a conveyance system having a transport deck for conveying sheet material along a feed path;
- a feed input station for stacking the sheet material on the transport deck to produce a multi-sheet collation;
- first and second serially arranged processing stations each defined by a first pair of alignment mechanisms disposed along the feed path and adjacent the transport deck, the alignment mechanisms adapted to align opposed edges of the multi-sheet collation, each alignment mechanism furthermore having a registration member disposed across the feed path and a displacement mechanism adapted to reposition the registration member from an active position above the transport deck to an idle position below the transport deck, the displacement mechanism furthermore adapted to oscillate the registration member into and out of engagement with one of the opposed edges of the multi-sheet collation when the registration member is in the active position;
- a processor adapted to control the motion of the conveyance system relative to the processing stations, and control the displacement mechanism to (i) raise the registration surfaces into the active position, (ii) oscillate the registration surfaces to align the opposing edges of the multi-sheet collation, and (iii) lower the registration surfaces into the idle position to facilitate conveyance of the aligned multi-sheet collation along the feed path.

10. The mailpiece inserter according to claim 9 wherein the opposed edges correspond to leading and trailing edges of the multi-sheet collation and further comprising:

a side registration system operative to engage a side edge of the multi-sheet collation orthogonal to the leading and trailing edges thereof; the side registration system including a second pair of registration members each having a registration surface disposed parallel to the feed path and a second displacement mechanism adapted to oscillate a registration surface of at least one of the second pair of registration members to align the side edges of the multi-sheet collation and wherein the processor is operative to control the motion of the second displacement mechanism to align the side edge of the multi-sheet collation into and out of displacement mechanism.

11. The mailpiece inserter according to claim 10 wherein at least two of the first pairs of registration members are disposed along the feed path and define serially arranged processing stations, and wherein the second pair of registration members are adapted to align the lateral side edges of the multi-sheet collation at each of the processing stations.

12. The mailpiece inserter according to claim 9 wherein the first pair of registration members each define a base and wherein the first displacement mechanism, in combination with the base of each registration member, defines a four-bar linkage arrangement adapted to raise and lower the registration members relative to the transport deck of the conveyance system.

13. The mailpiece inserter according to claim 12 wherein one of the first pair of registration members and respective displacement mechanism engages one of the leading and trailing edges of the multi-sheet collation to align the edges thereof.

14. The mailpiece inserter according to claim 9 wherein the first pair of registration members each define a base and wherein the first displacement mechanism, in combination with the base of each registration member, defines a four-bar linkage arrangement, the four bar linkage arrangement defined by a pair of links pivotally mounted to the base of each registration member at one end thereof and pivotally mounted to an intermediate fitting at the other end.

15. The mailpiece inserter according to claim 14 wherein at least one of the first displacement mechanisms further includes a linear guide disposed between the intermediate fitting and a clamp attachment, and an actuator operative to effect linear translation of the displacement mechanism within the linear guide.

16. The mailpiece inserter according to claim 14 wherein the intermediate fitting includes a pair of clevis arms connected by a substantially planar base and wherein a pair of links pivotally mount to each of the clevis arms at one end and to the base of the registration member at the other end and further comprising a linear actuator disposed between the planar base of the intermediate fitting and the underside of a respective registration member.

17. The mailpiece inserter according to claim 9 wherein the conveyance system includes first and second conveyor belts and wherein the registration member of each alignment device is disposed between the first and second conveyor belts.

* * * * *